Patented Sept. 7, 1948

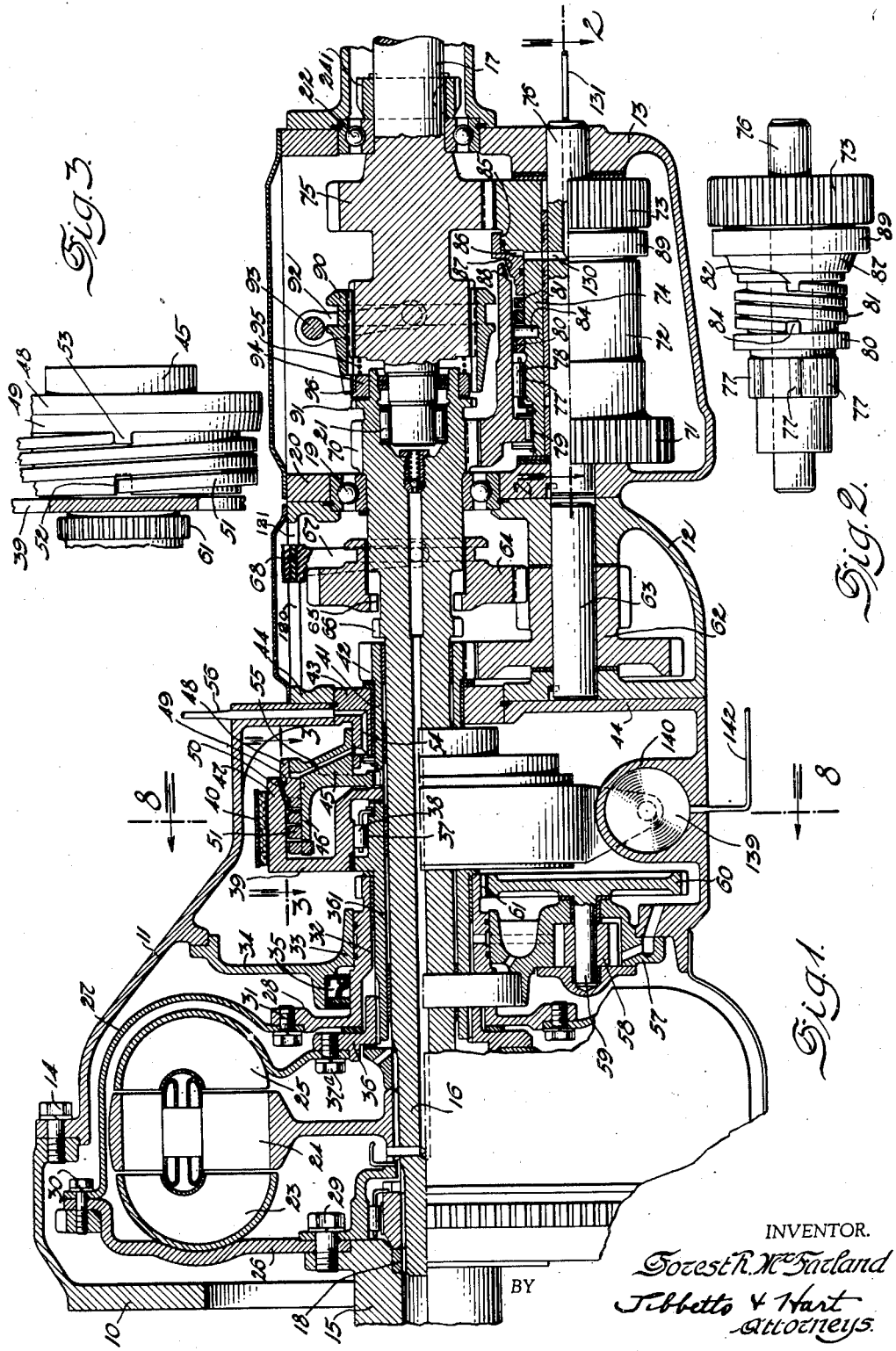

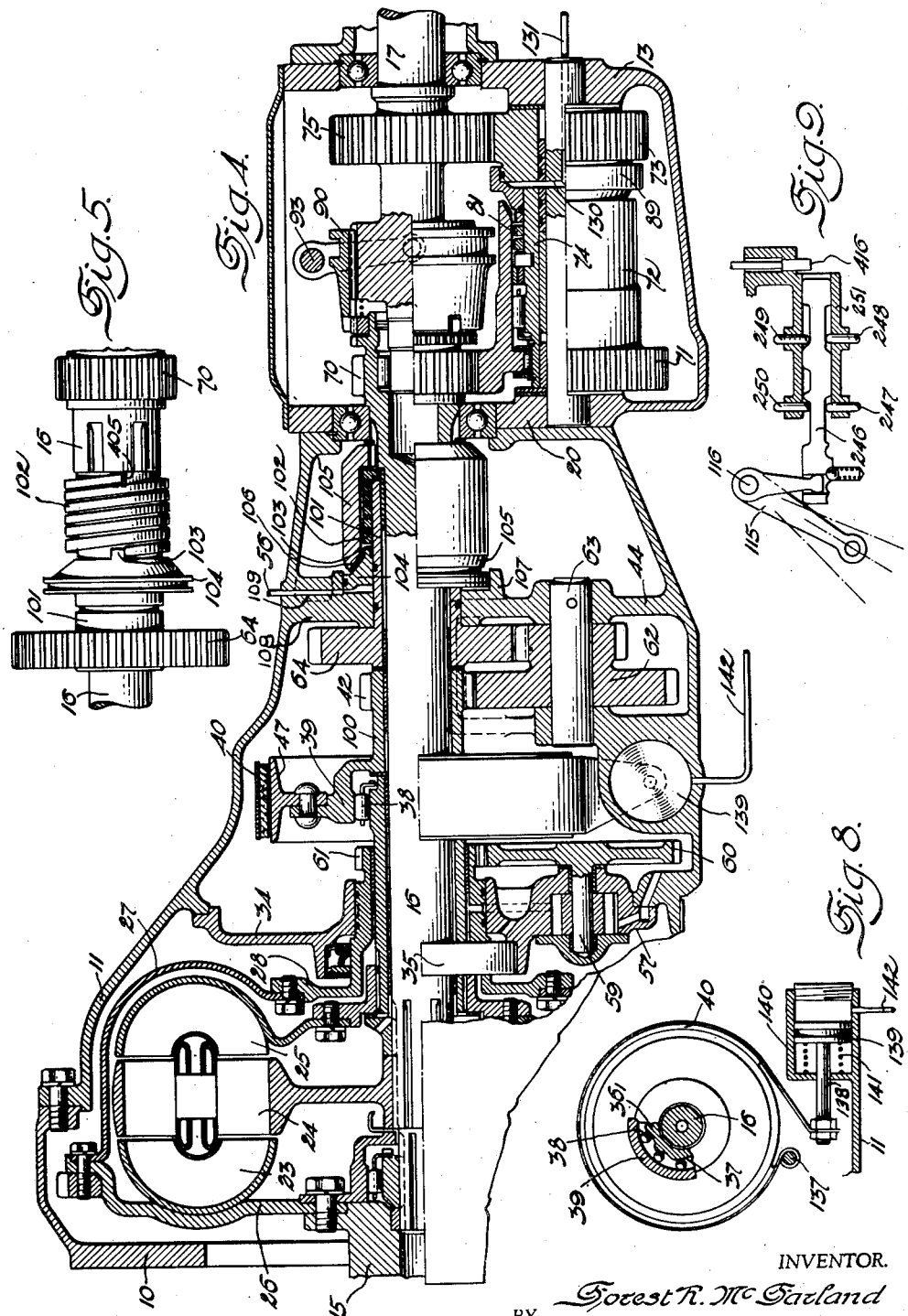

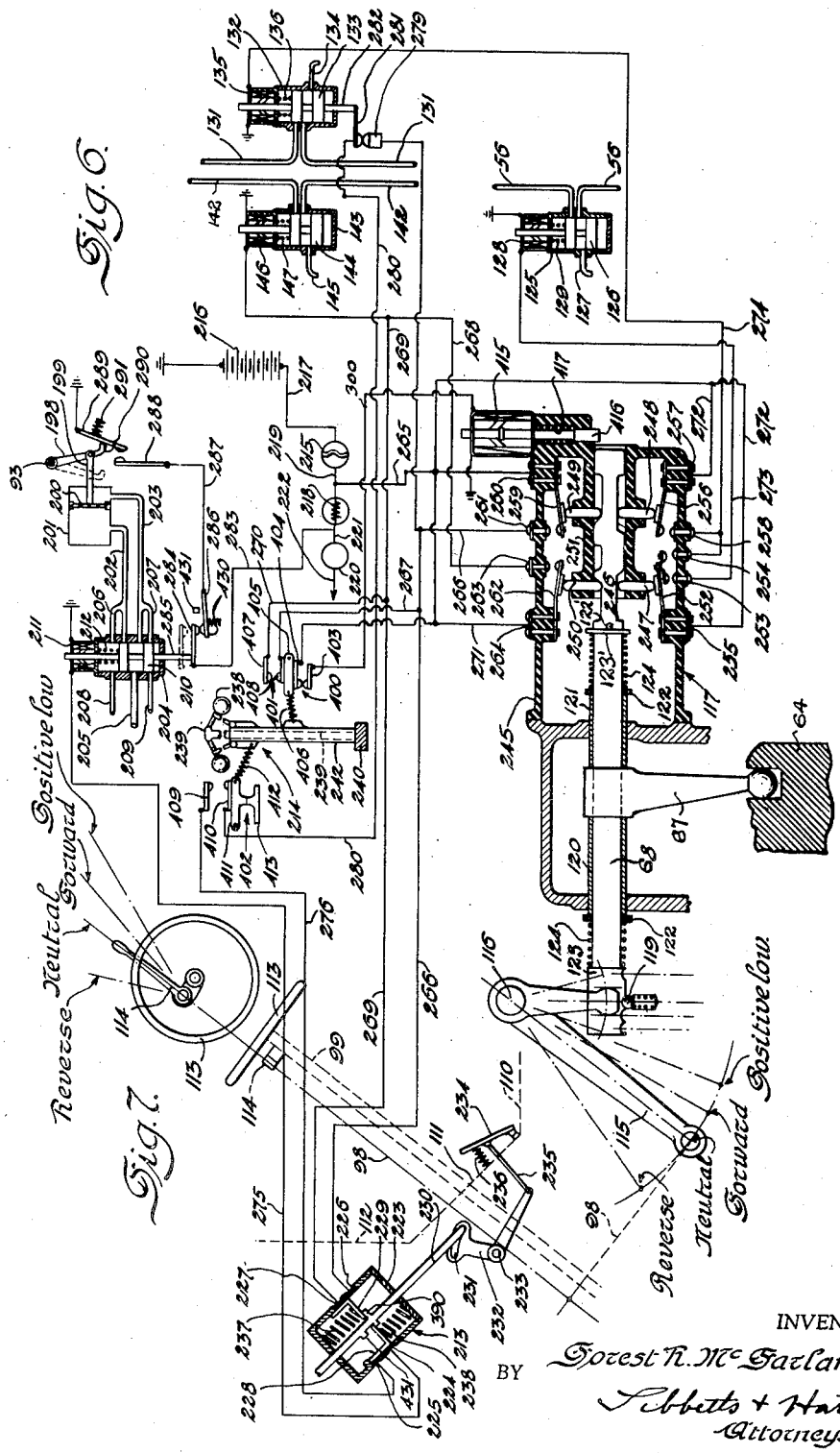

2,448,678

UNITED STATES PATENT OFFICE 2,448,678

MOTOR VEHICLE TRANSMISSION AND CONTROL MECHANISM THEREFOR

Forest R. McFarland, Huntington Woods, Mich., assignor to Packard Motor Car Company, Detroit, Mich., a corporation of Michigan Application September 16, 1942, Serial No. 458,494

25 Claims. (Cl. 74—472)

1

This invention relates to transmissions and more particularly to transmissions having a fluid torque converter incorporated therein.

An object of the invention is to provide a transmission in which a torque converter abutment member can be utilized to establish either forward or reverse drive.

Another object of the invention is to provide a transmission with change speed mechanisms through which either a free wheeling or positive drive can be selectively obtained.

Another object of the invention is to provide means for controlling a transmission having a fluid torque converter whereby the torque converter reaction member can be held or released to establish forward or reverse drive.

Another object of the invention is to provide control mechanism for a transmission incorporating a torque converter and change speed gearing whereby positive drive can be obtained through the change speed gearing when either forward or reverse drive has been selected.

A further object of the invention is to provide a motor vehicle transmission and control in which forward or reverse drive can be established by holding or releasing a torque converter reaction member and in which two driving speeds can be automatically established in forward drive under the supervision of a governor and throttle control mechanism.

Other objects of the invention will appear from the following description taken in connection with the drawings, which form a part of this specification, in which:

Fig. 1 is a sectional view of a transmission incorporating the invention;

Fig. 2 is a plan view taken on line 2—2 of Fig. 1 showing the coupling for positively connecting the change speed gearing;

Fig. 3 is a plan view taken on line 3—3 of Fig. 1 showing the coupling for establishing the reverse drive from the abutment portion of the torque converter;

Fig. 4 is a sectional view, similar to Fig. 1, showing a modified form of transmission;

Fig. 5 is a plan view of the coupling shown in Fig. 4 for connecting the reverse drive mechanism with the driven shaft;

Fig. 6 is a diagrammatic view of the control mechanism for the transmission shown in Fig. 1;

Fig. 7 is a plan view of a vehicle steering wheel and control lever for the control mechanism shown in Fig. 6;

Fig. 8 is a sectional view of the abutment con-

2 trol brake mechanism taken approximately on line 8—8 of Fig. 1;

Fig. 9 is a fragmentary sectional view of the control mechanism for the transmission shown in Fig. 4.

Referring now to Fig. 1 of the drawings, a transmission housing is formed of sections 10, 11, 12 and 13 secured in aligned relation by suitable means, such as bolts 14. An engine operated driving shaft 15 extends into housing section 10 and driven shaft 16 extends through housing sections 11 and 12 and into sections 10 and 13. Tail shaft 17 extends into housing section 13 and all three shafts are arranged in axial alignment. The forward end of shaft 16 projects into a recess in the rear end of the driving shaft, and is mounted in bearing 18, while the rear end of the driven shaft is carried by bearing 19 in the front wall 20 of housing section 13. The forward end of the tail shaft is carried by bearing 21, arranged in a recess in the rear end of the driven shaft, and by bearing 22 in the rear wall of housing section 13.

The driving and driven shafts are drivingly connected by mechanism including a hydraulic torque converter having an impeller 23, a driven member 24 and a reaction member 25, all of which can be bladed and associated in a conventional manner. The torque converter casing is made up of sections 26, 27 and 28, section 26 being secured to the drive shaft by bolts 29. Section 27 is connected to section 26 by bolts 30 and section 28 is fixed to section 27 by bolts 31. The impeller 23 is fixed to casing section 26 and the driven member 24 is splined to shaft 16. Section 28 is formed with a hub 32 extending through flange bearing 33 of interior wall 34 in housing section 11 and this bearing carries seal 35 to prevent fluid escape along the hub. Bolts 37a fix the reaction member 25 to sleeve 36 and such sleeve is splined to sleeve 361 extending through and rotatably mounted in hub 32. The peripheral end portion of sleeve 361 is formed with cam surfaces 37 on which rollers 38 ride and these rollers also bear against an abutment ring member 39 that can be held stationary or released by brake band 40.

When the abutment member 39 is held stationary by brake 40, the rollers 38 will prevent reverse rotation of the reaction member 25 of the torque converter and power will flow from the driven member 24 to the driven shaft 16.

Provision is made to drive the driven shaft reversely through reduction gearing contained in housing section 12 receiving power from the torque converter reaction member. A sleeve 41, to which is fixed gear 42, is rotatably mounted on shaft 16 and extends through a bearing 43 in the adjacent end walls 44 of housing sections 11 and 12. A clutch hub 45 is splined to sleeve 41 and the rim portion 46 of the hub is coaxial with and projects into the rim portion 47 of the abutment member. Piston 48 is slidably mounted on the hub rim and has a conical peripheral portion 49 adapted to engage friction ring 50 on the abutment rim. A coil spring 51 is arranged between the hub rim and the clutch hub rim, one end of the spring projecting into a slot 52 in the hub rim and the other end of the spring abutting a lug 53 projecting from the conical end of the hub rim. The spring is wound to normally have a slightly smaller diameter than the abutment rim so that it is clear thereof, but when the piston is frictionally engaged with the abutment rim the spring will expand to couple the rims together.

The piston can be engaged against the pressure of the spring by power means. Bearing 43 has a passage 54 therein communicating with passage 55 in the clutch hub. Fluid pressure is supplied to these passages from a pump through a conduit 56 and acts against the rear of the piston. The control for the fluid pressure will be described hereafter.

Wall 34 carries a pump housing 57 in which is arranged a conventional gear pump, the driver gear 58 of which is shown mounted on shaft 59 extending through the housing. Gear 60 is fixed on this shaft and meshes with gear 61 formed on sleeve 32 that is fixed to rotate with the torque converter impeller. This pump can be connected with conduit 56, with the interior of the torque converter, with passages leading to points in the mechanism requiring lubrication and with hydraulic controls to be described hereafter.

Gear 42 lies in housing section 12 and meshes with cluster gear 62 rotatably mounted on lay shaft 63. Gear 64 meshes with the cluster gear and is axially shiftable on shaft 16. Clutch gear 64 has interior clutch teeth 65 arranged to engage with clutch teeth 66 on shaft 16 and is shifted by fork 67 fixed on shaft 68. The gear 64 is shifted to engage clutch teeth 65 with teeth 66 only when reverse drive is desired.

Housing section 13 contains change speed gearing. Driven shaft 16 projecting into this housing section has gear 70 fixed thereto which meshes with gear 71 on sleeve 72. Gear 73 is fixed to sleeve 74 that is rotatably mounted on shaft 76 and meshes with gear 75 formed on tail shaft 17. Sleeve 74 is telescoped by sleeve 72 and coupling means is provided therebetween to establish two one-way driving connections, one of which is an overrunning clutch and the other of which is a friction clutch. Sleeve 74 has cam surfaces 77 formed thereon on which rollers 78 ride and these rollers are free to engage with sleeve 72. The rollers will wedge between the adjacent surfaces of the sleeves to form a one-way overrunning drive that is well-known in the art. The sleeves are maintained in aligned spaced relation by bearings 79 and 80.

The friction driving connection through the coupling means is obtained by the combination of the roller clutch and coil spring 81 arranged between sleeves 72 and 74, such spring having one end bearing against a boss 82 extending axially from piston 89 and the other end abutting a pin 84 fixed to sleeve 74. The spring is normally of smaller diameter than the inner diameter of sleeve 72. Piston 89 is mounted to be moved axially on sleeve 74 and telescopes a shoulder 85 on gear 73 to provide a leakproof fluid chamber 86. The piston also has a peripheral cone surface 87 adapted to engage with a friction ring 88 on the interior conical rear end of sleeve 72. When fluid is admitted to chamber 86, piston 89 will be forced forwardly to engage ring 88 so that it will rotate with sleeve 72 and such rotation will expand the coil spring anchored to sleeve 74 to engage sleeve 72 and thereby frictionally clutch the sleeves in driving relation in coast. When the drive passes through either the one-way or friction clutch means there is a speed reduction because the associated gearing is so designed.

The driven shaft and the tail shaft can also be directly connected by a positive coupling to provide direct drive. Sleeve 90 is slidably splined on the tail shaft and the internal splines are arranged to be engaged with teeth 91 on the driven shaft. The sleeve is shifted by yoke 92 fixed to a rock shaft 93. A conventional synchronizer mechanism is arranged between the sleeve 90 and teeth 91 to prevent clash when an engaging operation takes place. A blocker ring 94 is held on the driven shaft adjacent clutch teeth 91 by coil spring 95 bearing against the tail shaft and has spaced radial extensions 96 projecting into the path of the splines of the clutch sleeve. Certain splines of the sleeve are spaced to receive the blocker extensions when the shafts 16 and 17 are rotating at approximately the same speed so that shifting of the sleeve can proceed to engage the clutch teeth 91.

Except for minor differences in the housing construction, the structure shown in Fig. 4 differs from that shown in Fig. 1 mainly in the mechanism for establishing reverse drive from the torque converter abutment means to the driven shaft. In Fig. 4, gear 42 is formed as a part of sleeve 100, which is an extension of the abutment member 39. Gear 42 meshes with cluster gear 62 and the cluster gear meshes with gear 64 as previously described but, in this instance, gear 64 is formed with a rearwardly extending sleeve 101 which is coupled to the driven shaft by a friction clutch. Such clutch comprises a coil spring 102 having one end abutting a projection 103 on piston 104 and the other end anchored in an opening 405 in sleeve 101. Clutch sleeve 105 extends around the coil spring and is splined to the driven shaft 16. The inner forward end of the sleeve 105 is conical and has fixed thereto a friction ring 106 adapted to be engaged by a conical surface on the rear end of piston 104. The piston is axially movable in a flange 107 on the wall 44 of the housing under fluid pressure and when it engages clutch sleeve ring 106, the coil spring 102 will expand to engage sleeve 105 to drive the same from sleeve 101 to which it is anchored. Fluid enters the piston chamber formed by flange 107 through a passage 109 in wall 108 and this passage connects with conduit 56 leading from the pump housing 57. Springs 51, 81 and 102 normally move the associated pistons out of frictional engagement and the fluid force must overcome the spring force to establish the couplings.

The control system for the transmission is diagrammatically illustrated in Figs. 6, 7 and 9. A motor vehicle floor 110 terminates in toeboard 111 which in turn terminates in dash 112. The vehicle steering mechanism column 99 extends through the toeboard and has the usual handwheel 113 at the upper end thereof. A hand lever 114 for the transmission control system is anchored on the steering column adjacent the steering wheel and is connected by suitable linkage 98 to actuate bell crank 115 that rocks on stationary shaft 116 to control a main switch structure 117 and the positive reverse clutch fork 67. The bell crank engages in a slot in control rod 68 to shift it axially and the rod is notched to receive a spring actuated retaining detent 119 at its several positions of adjustment. Sleeves 120 and 121 are slidably mounted on the rod and fork 67 is arranged to move with such sleeves. The sleeves are positioned on the rod by suitable coil springs 124, one end of such springs engaging washers 122 at remote ends of the sleeves. The other end of the forward spring engaging head 123 on the rod and the other end of the rear spring engaging washer 123' bearing against pin 122' projecting from the rod. Movement of rod 68 compresses front or rear spring 124 causing movement of fork 67.

Passages 54 and 55 connected with the chamber behind piston 48 are connected with pump casing 57 by conduit 56 and interposed in such conduit is a control means consisting of a casing 125, piston valve 126 and vent 127. Solenoid 128 is fixed to the housing to actuate the piston valve for controlling fluid flow through conduit 56 and spring 129 in the housing normally moves the valve piston to position shutting off fluid flow. This fluid control will determine the position of piston 48 to control the relation of coupling spring 51 and the arrangement is such that engagement will be established thereby only when reverse drive is desired.

Chamber 86 is in communication with an angular passage 130 in lay shaft 76 and conduit 131 establishes a connection from passage 130 to the pump casing 57. A fluid control means is interposed in conduit 131 and comprises a housing 132, a piston valve 133 and a housing vent 134. The piston valve is moved by a solenoid 135 to open conduit 131 and is normally held in closed position by spring 136. This valve, when open, permits flow of fluid to piston 85 to engage coupling spring 81 in driving relation and the arrangement is such that this takes place for reverse drive and for positive drive in low speed forward drive.

Brake 40 is applied to hold abutment member 39 stationary by mechanism actuated hydraulically. One end of the brake band is fixed to an anchor pin 137, see Fig. 8, and the other end is fixed to rod 138 attached to piston 139 in cylinder 140. Spring 141 in the cylinder acts against the piston to normally release the brake band and fluid acts against the piston to apply the brake band. Conduit 142 connects the cylinder with the pump casing 57 and interposed in the conduit is a control means comprising housing 143, piston valve 144 and housing vent 145. Solenoid 146 acts to move the piston valve to allow fluid flow through the housing and spring 147 normally acts against the piston valve to shut off fluid flow through the housing. When the valve is opened, fluid will flow to apply the brake and thereby hold the abutment for the torque converter reaction member.

The shaft 93 for controlling change speed clutch 90 is operated by power. An arm 198 is fixed to such shaft and is connected by rod 199 of piston 200 in cylinder 201 which is connected with the usual intake manifold of the engine (not shown) of which the crankshaft has been referred to as driving shaft 15. Conduits 202 and 203 lead from the end portions of the cylinder to a valve housing 204 and conduit 205 leads from the valve housing to the engine intake manifold. Vent branches 206 and 207 extend from conduits 202 and 203 to the valve housing and vents 208 and 209 lead from the valve housing in alignment with the vent branches. A piston valve 210 in the housing 204 is under the control of solenoid 211 and spring 212. The spring normally moves the piston valve into the position shown in Fig. 6 to open conduit 203 to vacuum and to cut off the connection of conduit 202 with the intake manifold which is open to atmosphere through vents 202 and 208. When the solenoid 211 is energized, the valve is shifted to connect conduit 202 with the manifold conduit 205 and connecting conduit 203 to atmosphere through vents 207 and 209. Thus, when the solenoid is energized, piston 200 will be moved to the left by vacuum and will cause shaft 93 to be rocked to shift clutch 90 into positive driving engagement with clutch teeth 91 on shaft 16 when permitted by blocker 94.

The solenoid actuated valves in the control system comprise part of an electric system under the supervision of the manually controlled main switch 117, a kick-down switch 213, a governor switch 214 and ignition switch 215. The vehicle battery 216 is connected by conductor 217 with the ignition switch, the ignition switch is connected with coil 218 by conductor 219, the distributor 220 is connected with the coil by conduit 221 and conductor means 222 leads from the distributor to the engine spark plugs (not shown).

The kick-down switch is carried in housing 223 and has two pair of contacts 224, 225 and 226, 227 fixed in openings in the wall thereof. Separately movable angular switch members 228 and 229 are slidably mounted in the housing, member 228 acting to connect contacts 224 and 225 and member 229 acting to connect contacts 226 and 227. The movable switch members are controlled by an actuator rod 230 extending through the housing and having one end bent to ride in an arcuate slot 231 in an arm of bell crank 232 mounted on a pivot 233. The bell crank is connected with an accelerator pedal 234 by a link 235 which also serves to control the engine throttle valve (not shown). The accelerator is pivoted to the toeboard and spring 236 acts to move the free end of the accelerator away from the toeboard so that the engine will idle. Spring 237 in housing 223 acts to normally engage switch member 229 with contacts 226 and 227 while spring 238 normally acts to engage switch member 228 with contacts 224 and 225.

The governor actuated switch 214 includes a shaft 239 having gear 240 fixed to one end and governor weights 238 pivoted to the other end. Gear 240 is driven by suitable mechanism (not shown) actuated by gear 241 fixed to the tail shaft. Sleeve 242 is slidably mounted on shaft 239 and is connected by links with the governor weights to be shifted axially therewith. The sleeve controls three switches 400, 401 and 402, all of the overcenter type. Switch 400 includes a stationary contact member 403 and a movable contact member 404 carried by a pivotally mounted carrier 405 having its free end connected by spring 406 with sleeve 242. Switch 401 includes a stationary contact member 407 and a movable contact member 408 mounted on carrier 405. Switch 402 consists of a stationary contact member 409 and a movable contact member 410 fixed on a pivoted carrier 411 having its free end connected with sleeve 242 by spring 412. Stop member 413 limits movement of carrier 411 in a direction away from switch member 409.

The main control switch includes a housing 245 in which is arranged a switch actuator member 246, fixed to rod 68, for making connections dictated by the position of lever 114. Switch member 246 as cam means or abutments for actuating plungers 247, 248, 249 and 250, such plungers being slidably mounted in an inner housing 251 serving as a container for the switch member 246. Plunger 247 is arranged to control a double contact self-opening spring contact member 252 that will connect contacts 253 with contacts 254 and 255. Plunger 248 is arranged to control self-opening spring contact member 256 to connect contact 257 with contact 258. Plunger 249 is arranged to control self-opening spring contact member 259 to connect contact 260 with contact 261 and plunger 250 is arranged to control self-opening spring contact member 262 to connect contact 263 with contact 264.

Contact 260 is connected with conductor 219, leading from the battery, by conductor 265 while contact 261 is connected with kick-down switch contact 226 by conductor 266. Conductor 267 leads from conductor 266 to governor contact member 408. Contact 263 is connected with solenoid 146 by conductor 268, and conductor 269 leads from conductor 268 to contact 227 of the kick-down switch. Conductor 269 is connected by conductor 270 with governor contact member 407. Contact 264 is connected by conductor 271 with contact member 404 and conductor 272 connects conductor 271 with contacts 257 and 255 and with conductor 265. Contact 253 is connected with solenoid 128 by conductor 273 while contacts 254 and 258 are connected with solenoid 135 by conductor 274. Kick-down contact 224 is connected with solenoid 211 by conductor 275 while contact 225 is connected with governor contact member 409 by conductor 276.

Conductor 266 extends to a fixed contact 279 of a control switch, and conductor 280 connects a movable contact 281 of such switch with governor contact member 410. Switch contact 281 is fixed to a stem 282 projecting from valve 133 and moves therewith to make and break the switch connection. This switch connection when broken will overrule the governor switch.

The ignition switch lies between the battery and the electric system controlling the change speed mechanism and such switch must be closed in order that the system may function. When the ignition switch 215 is closed, conductors 265 and 283 will be connected with the battery so that the electric control system is ready to function.

With the control lever in neutral position, as shown in Figs. 6 and 7, the main switch actuator is in a position allowing self-opening switches 252, 256, 262 and 259 to be open so that the solenoids 128, 135 and 146 will be deenergized and the associated valves 126, 133 and 144 will be closed. Solenoid 211 will also be deenergized so that valve 210 will open conduit 203 to the engine intake manifold causing the vacuum-operated shaft 93 to be rocked in a direction disengaging clutch 90. The switch control rod 68, when in neutral position, will locate fork 67 to disengage the gear clutch 64. As brake 40 is released, the engine can be operating and the torque converter will idle.

In order to obtain reverse drive, the lever 114 is shifted to the left from neutral position, as view in Fig. 7, and this will shift the switch control rod 68 toward the left, as viewed in Fig. 6. The first part of the movement of the switch member 246 will cause plunger 250 to be moved outwardly to engage switch contact 262 with contact 263 and as conductor 271 is connected with conductor 265 this will energize solenoid 146 through conductor 268. Energizing this solenoid will move valve 144 upwardly opening the fluid power line 142 creating a force on piston 139 to apply brake 40. This movement of the switch control rod will move fork 67 in a direction to engage teeth 65 of gear 64 with teeth 66. The brake application is prior to engagement of teeth 65 and 66. As movement of the control rod 68 is continued toward the left, plunger 247 will be moved outwardly to close switch member 252 with contacts 253 and 254 energizing solenoid 128 which actuates valve 126 causing fluid to flow through lines 56 and 55 to force piston 48 against cone 50 of abutment 39. Further movement releases plunger 250 so that switch member 262 will open and thereby deenergize solenoid 146 whereupon brake 40 will be released and abutment 39 will be driven in reverse direction by the reaction member 25 of the torque converter. Since the fluid pressure has caused piston 48 to engage ring 49 on the abutment member they will rotate in unison and this will cause spring 51 to expand and couple member 46 with the abutment whereby reverse drive is transmitted to gear 42 and through the reduction gearing 62 and 64 to the driven shaft 16 and thence through the reduction gearing to the tail shaft. Engagement of switch member 252 with contact 254 simultaneously with contact 253 has energized conductor 274 and solenoid 135 causing valve 134 to open and permit fluid under pressure to flow through conduit 131 into passage 130 and chamber 86. This fluid pressure has moved piston 85 into engagement with sleeve ring 88 rotation of which will now cause spring 81 to expand to establish a positive coupling, as previously explained, between the gears 71 and 73 so that the reverse drive through such reduction gearing will be maintained while the mechanism is set for reverse drive.

It will be noted that reverse operation results because the reverse torque exerted on the driven shaft 16 by the reaction member 25 is multiplied through the gearing 42, 62, 64 to overcome the forwardly directed torque exerted on the driven shaft 16 by the driven member or turbine 24.

The torque converter may be assumed as having a torque multiplying ratio of 1.5 for the driven member or turbine 24, resulting in a torque multiplying ratio of .5 for the reaction member 25. The reverse gears 42, 62, 64 may be assumed as having a torque increasing ratio of 6.25 resulting from a torque increasing ratio of 2.5 in each gear set when the gear 64 is shifted to engage its internal clutch teeth 65 with the clutch teeth 66 of the driven shaft 16. When the engine is accelerated in the reverse drive position the driven member or turbine 24 will transmit 1.5 times engine torque to the driven shaft 16 tending to rotate it in the forward direction. The reaction member 25 has a resulting torque reaction of .5 times engine torque tending to rotate the abutment member 39, sleeve 41 and gear 42 in the direction opposite to engine rotation. This torque is multiplied by the torque increasing ratio of 6.25 in the gears 42, 62 and 64 resulting in a reverse torque of 3.12 being applied to the driving shaft 16. The forwardly directed torque of 1.5 times engine torque exerted on the driven shaft 16 by the driven member or turbine 24 must be subtracted from the reverse torque of 3.12 times engine torque exerted on the driven shaft 16, by the reaction member 25 and the torque increasing gearing 42, 62, 64, resulting in a net reverse torque of 1.62 times engine torque. This net reverse torque is further multiplied by the gears 70, 71, 73 and 75 having a torque increasing ratio of approximately 1.5 or somewhat greater, to provide a total reverse torque of 2.43 or greater at the tailshaft of the transmission. If a higher torque multiplication is desired a correspondingly higher ratio of reduction can be designed in gears 42, 62 and 64.

In order to obtain forward drive, lever 114 is shifted to the right from neutral position, as viewed in Fig. 7, which will move the main switch actuator 246 to the right, as viewed in Fig. 6, causing plunger 249 to close switch member 259. Conductor 265 will thus be connected with conductor 266 but current must pass through contact member 229 of the kick-down switch to energize conductor 269 connected with solenoid 146 before the solenoid is energized to apply brake 40. When the accelerator pedal is released, bell crank 232 acts to move rod 230 upwardly and through means of a lug 390 fixed on the rod, contact 229 is moved away from contact 226 against the action of spring 237 acting to move contact 226 downwardly. Thus, the main switch can be set for forward drive but the torque converter will idle until the brake is applied to the abutment and the accelerator must be depressed slightly to allow switch member 229 to be moved to energize solenoid 146 to shift valve 144 to open position so that fluid can flow into cylinder 140 to act on piston 139 and apply brake 40 to the abutment. Solenoids 128, 135 and 211 will be deenergized while switch 400 is closed so the drive will be through the gears 71 and 73 connected by clutch rollers 78.

In starting up with the vehicle speed below a certain speed, say five miles per hour, governor switch 400 will be closed. Contact member 403 is connected with solenoid 415 by conductor 300 and will be energized in order to move a plunger stop member 416 out of the path of actuator 246. This stop member is acted upon by spring 417 to normally project it into the path of movement of the actuator 246. Thus the switch actuator can be shifted to the right beyond forward drive position only while the vehicle speed is below five miles an hour as switch 400 is opened by the governor switch above such speed.

This forward position of the ain switch actuator can be maintained for all forward vehicle speeds and the governor switch takes control to automatically establish gear relations. The sleeve 242 is moved with the weights as their position is shifted by vehicle speed, and switch 400 stays closed until five miles per hour vehicle speed is reached, whereupon switch carrier 405 is snapped upwardly by spring 406 to engage switch 401 and to disengage switch 400. This will deenergize solenoid 415 but brake 40 will remain applied to the abutment because contact member 407 connects with conductor 269 through conductor 270 and contact member 408 connects with conductor 265 through conductor 267 and such arrangement maintains current flow even though the accelerator pedal is released disconnecting contacts 226 and 227. Solenoids 211, 135 and 128 will be deenergized so the drive will be the same as below five miles an hour except that the kick-down switch has no control. This condition is maintained up to some predetermined speed, say twenty miles per hour, when switch 402 will be closed. Solenoid 146 will remain energized because switch 401 remains closed and thus the brake 40 remains engaged with the abutment.

When switch 402 is energized conductor 276 will energize conductor 275 and solenoid 211. Valve 210 will be moved upwardly opening conduit 203 to atmosphere and connecting conduit 202 with intake manifold 205. Vacuum will thus pull piston 200 to the left, as viewed in Fig. 6, and through arm 198 connected with the piston will turn shaft 93 to shift clutch 90 into engagement with teeth 91 on shaft 16, to establish direct drive to the tail shaft on which the clutch is splined, as soon as synchronization permits. Momentary lifting of the accelerator accomplishes synchronization.

When direct drive is established, the driver can overrule the same by depressing the accelerator pedal beyond wide open throttle position to reestablish the lower speed drive through the reduction gears and overrunning clutch therein. Rod 230 is moved downwardly by bell crank 232 and has a boss 431 thereon that will engage the contact member 228 to shift it out of engagement with contact 225 and thus deenergize solenoid 211. When solenoid 211 is deenergized, contact is made between points 284 and 430. Contact has previously been made between points 288 and 290. The ignition is now grounded causing a torque reversal permitting vacuum in line 203 acting on piston 200 causing arm 198 to turn rocker shaft 93 causing disengagement of clutch sleeve 90 with teeth 91. As switch 401 is still effective, the drive through the reduction gearing will be effective. The accelerator pedal must be held down to maintain this reduction gearing drive while the vehicle is operating above twenty miles an hour in forward speed setting. When the accelerator pedal is released to the driving range position, spring 238 will return contact 228 to engagement with contact 225 and direct drive will be reestablished.

When forward drive is through the reduction drive, the overrunning clutch connects gears 71 and 73, and thus the engine will not act to brake the vehicle under some driving conditions, such as when going downhill. Another control is provided for the reduction gearing to cause positive drive therethrough through coupling spring 81. When such a solid underdrive is desired, the lever 114 is moved to the right of forward position, as viewed in Fig. 7, which will shift the main switch actuator 246 to the right, as viewed in Fig. 6, moving plunger 248 outwardly to engage contact member 256 with contact 258. Switch member 259 will also be closed so that switch 400, while closed, will energize solenoid 415 and thereby hold stop member 416 out of the path of switch actuator 246 so that it can be shifted to engage contact member 256. If switch 400 is open then the current to solenoid 415 is broken and stop member 416 blocks movement of the switch actuator to a position moving plunger 248 outwardly. As a result of such arrangement, the shift into positive reduced drive can be made only when the vehicle speed is less than five miles per hour.

With the switch member 256 engaging contact 258, current flows through conductor 272 from conductor 265 to contact 257 and through conductor 274 to solenoid 135 which will be energized to open valve 134 and allow pressure to shift piston 86 to engage coupling 81 in positive driving relation with gears 71 and 73. This opening movement of valve 134 will move contact 281 away from contact 279 breaking current flow to switch 402 to overrule the governor in the event the vehicle speed becomes such that the governor would cause a shift into positive direct drive.

It will thus be seen that coupling 81 combined with the roller clutch establishes a positive drive through the low speed gearing when driving in reverse gear or, when desired, in forward gear. In the governor controlled forward drive, below twenty miles per hour and when the kick-down switch is open, the overrunning clutch will establish the drive through the low speed gearing. Positive clutch 90 is engaged only when the vehicle is travelling forward above twenty miles per hour. The kick-down switch also controls the application of the abutment brake when starting in forward.

The control mechanism for the form of transmission shown in Fig. 4 is the same as for the transmission shown in Fig. 1 with the exception that bell crank 115 is arranged to directly engage the main switch actuator 246 as shown in Fig. 9. The rod 68 for shifting fork 67 is unnecessary as the reduction gears 42, 62 and 65 are constantly in mesh. The expansion of spring 102 in Figs. 4 and 5 couples the abutment driven mechanism with the driven shaft for reverse drive when the brake 40 is released, while in Fig. 1 the spring 51 serves the same function but, in addition, clutch gear 64 must be engaged with teeth 66.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a transmission, a driving shaft, a driven shaft, a hydraulic torque converter operative to couple said shafts, said converter including a reversely operated reaction member, abutment means for restraining said reaction member from being driven reversely, control means operable to hold or release said abutment means, and coupling means being operable to drivingly connect the driven shaft with the abutment means for reverse drive when said abutment means is released by said control means.

2. In a transmission, a driving shaft, a driven shaft, a hydraulic torque converter operative to couple said shafts and including a reversely operated reaction member, means including an abutment member coupled to said reaction member, a brake operable to hold or release said abutment member, and means operable to connect said abutment member in relation for reversely driving the driven shaft at a reduced speed when said brake is released.

3. In a transmission, a driving shaft; a driven shaft; a fluid torque converter having an impeller rotated by the driving shaft, a driven member drivingly connected with the driven shaft and a reversely rotated reaction member; abutment means for restraining said reaction member from being driven reversely, means for holding or releasing said abutment means, and means operable to effect a driving couple from said abutment means, when released, to said driven shaft whereby the driven shaft is driven reversely by the torque converter.

4. In a transmission, a driving shaft; a driven shaft; a hydraulic torque converter having an impeller driven by the drive shaft, a driven member coupled to the driven shaft and a reaction member; abutment means; a one-way over-running clutch for coupling said reaction member with the abutment means; means operable to hold or release said abutment means; and means for drivingly connecting said abutment means with said driven shaft to drive said shaft reversely when said abutment means is released.

5. In a vehicle transmission, a driving shaft, a driven shaft, a hydraulic torque converter including a reaction member drivingly connecting said shafts, abutment means restraining said reaction member from being driven reversely when held stationary, means operable to hold or release said abutment means, said abutment means being rotated in a reverse direction when released, controlled power means connected to actuate said holding or releasing means, and gearing operable by said abutment means when released to drive the driven shaft reversely.

6. In a transmission, a driving shaft, a driven shaft, a torque converter drivingly connecting said shafts and having a reversely driven reaction member, an abutment member, a one-way clutch between the abutment member and the reaction member, a brake operable to hold or release the abutment member, reduction gearing rotated by said abutment member, and clutch means operable to connect the gearing in relation to drive the driven shaft reversely.

7. In a transmission, a driving shaft, a driven shaft, a torque converter drivingly connecting said shafts and having a reversely driven reaction member, an abutment member, adapted to be driven reversely with the reaction member, a one-way clutch means between the abutment member and the reaction member, a brake for the abutment member, reduction gearing operable to drive the driven shaft, and clutch means operable to drivingly connect the abutment member with the reduction gearing to drive the driven shaft reversely when the brake is released.

8. In a transmission, a driving shaft, a driven shaft, a hydraulic torque converter connected with said shafts and including a reversely driven reaction member, abutment means for the reaction member, brake means for holding the abutment means, driving means between the abutment means and the driven shaft including clutch means, and control means shiftable into a plurality of relations, one of said relations of the control means engaging the brake means and disengaging the clutch means, another relation of the control means disengaging the brake means and engaging the clutch means to effect reverse drive of the driven shaft, and another relation of the control means disengaging both the brake means and the clutch means.

9. In a transmission, a driving shaft, a driven shaft, a hydraulic torque converter connected with said shafts and including a reversely drivable reaction member, abutment means rotatable reversely with the reaction member, a brake operable to hold the abutment means from reverse rotation, mechanism including a clutch operable to drive the driven shaft reversely from the abutment means when released by the brake, and control means operable to engage and release said brake and said clutch, said drive shaft being driven in a reverse direction by the torque converter reaction member when the abutment is released and the clutch engaged and driven in forward direction by the torque converter when the brake is engaged and the clutch released.

10. In a transmission, a driving shaft, a driven shaft, a hydraulic torque converter connected in driving relation with said shafts and including a reaction member, abutment means rotatable with said reaction member in a reverse direction, brake means operable to hold said abutment means from rotating reversely, drive mechanism including a clutch for connecting the abutment means with the driven shaft, fluid pressure means operable to cause engagement of the brake means and the clutch, and control means for the fluid pressure means operable to cause engagement of the brake means and disengagement of the clutch whereby forward drive is effected or to cause disengagement of the brake means and engagement of the clutch whereby reverse drive is effected.

11. In a transmission, a driving shaft, a driven shaft, a hydraulic torque converter connected in driving relation between the shafts and including a reversely operable reaction member, abutment means rotatable reversely with the reaction member, brake means operable to hold the abutment means from rotating reversely, mechanism including a clutch for driving the driven shaft reversely with the abutment means when released, a fluid pressure system operable to control engagement and disengagement of said brake means and said clutch, valves controlling the application of said system to said brake means and said clutch, an electric system controlling said solenoids, and manually shiftable control means for the electric system operable in one position to cause application of the brake and disengagement of the clutch and in another position to cause release of the brake and engagement of the clutch.

12. In a transmission, a driving shaft, a driven shaft, a hydraulic torque converter connected in driving relation between said shafts and including a reversely operable reaction member, an abutment means, a one-way clutch for connecting the abutment means and the reaction member for unitary reverse rotation, a brake operable to hold the abutment means from rotating reversely, a fluid pressure system operable to apply the brake to the abutment means, valve means in the pressure system controlling flow to apply the brake, and a control means for the valve means including a manually adjustable means for dictating the open or closed position of the valve means and another manually operated means for maintaining the control means in relation to maintain fluid pressure application of the brake.

13. In a motor vehicle driving system, an engine having an accelerator pedal controlled throttle, a driving shaft driven by the engine, a driven shaft, a hydraulic torque converter in driving relation with said shafts and including a reaction member, an abutment means fixing the abutment and reaction member together, a brake for holding said abutment stationary when applied thereto, a fluid pressure system, a valve adapted to control fluid flow from the system to apply the brake, a solenoid for opening and closing the valve, an electric control system for the solenoid having a pair of switches in series, one of said switches being operable to select a circuit for the solenoid to open the valve and the other switch being closed by the accelerator pedal while depressed to induce engine speed above idling whereby the torque converter will drive only when the engine is operating above idling speed.

14. In a transmission, a driving shaft, a driven shaft, a tail shaft, a hydraulic torque converter in driving relation with the driving shaft and the driven shaft including a reaction member adapted to be held stationary for forward drive or released for reverse drive, means for connecting the reaction member with the driven shaft, reduction gearing connecting the driven shaft and the tail shaft including a freewheeling clutch and a positive clutch, a fluid pressure system for engaging the positive clutch engageable to establish drive through the gearing, a valve controlling fluid flow to effect engagement and disengagement of the positive clutch, a solenoid for operating the valve, and an electric circuit controllable to energize or deenergize said solenoid, said freewheel clutch being automatically effective to establish drive through the reduction gearing.

15. In a transmission a driving shaft, a driven shaft, a tail shaft, a hydraulic torque converter in driving relation with the driving shaft and the driven shaft including a reaction member, means for holding or releasing said reaction member, mechanism including a clutch for driving the driven shaft with the reaction member when released for reverse drive, forward drive through the torque converter being effected when the reaction member is held, reduction gearing including a freewheel clutch and a positive clutch in driving relation between the driven shaft and the tail shaft, a clutch for directly driving the tail shaft from the driven shaft, fluid pressure means for controlling said positive clutches and the clutch in the reverse drive, an electric system for controlling the fluid pressure system, selector means in the electric system to establish reverse, forward and positive forward reduced drives, governor means in the electric system for selecting the forward drive through the reduction gearing or the direct clutch in accordance with tail shaft speed, and means for overruling said governor means when reverse drive and positive drive through the reduction gearing is dictated by the selector means.

16. In a transmission, a driving shaft, a driven shaft, a tail shaft, a hydraulic torque converter in driving relation with the drive shaft and the driven shaft including a reaction member, means operable to hold or release said reaction member, mechanism including a clutch for driving the driven shaft with the reaction member when released to effect reverse drive, forward drive through the torque converter being effected when the reaction member is held, reduction gearing including a freewheel clutch and a positive clutch in driving relation between said driven shaft and said tail shaft, a clutch operable to connect the drive shaft directly with the tail shaft, pressure means operable to control said means for holding or releasing said reaction member, said direct drive clutch and said positive reduction gear clutch, valves controlling said pressure means in its effect on said holding or releasing means, said direct drive clutch and said positive reduction drive clutch, solenoids controlling said valves, an electric system controlling said solenoids including a governor effective to energize the direct drive clutch and effect driving position thereof above a predetermined speed of the tail shaft, manually operable means for establishing a circuit to the positive clutch in the reduction gearing when the reaction member is held or released, and means under control of the valve controlling the positive clutch overruling the governor whenever such valve is open to engage such clutch.

17. In a transmission, a driving shaft, a driven shaft, a tail shaft, a hydraulic torque converter in driving relation with said driving and driven shafts including a reaction member, abutment means for the reaction member, a brake for holding or releasing said abutment means, reduction gearing including overrunning clutch means between two of the gears for driving the tail shaft from the driven shaft, a clutch for driving the tail shaft directly from the driven shaft, a fluid pressure means, means operated by said fluid pressure means for controlling the brake and the direct drive clutch, valve means controlling the application of the pressure means, solenoids controlling the valve means, an electric system for controlling the solenoids including switches operable to establish desired solenoid circuits, manually operable means for controlling the switch of the brake control circuit, and governor means operated by the tail shaft for controlling the switch of the solenoid circuit for the direct drive clutch while the manually controlled switch effects engagement of the brake to hold the abutment means.

18. In a driving system for a vehicle, an engine having an accelerator, a driving shaft driven by the engine, a driven shaft, a tail shaft, a hydraulic torque converter in driving relation with said driving and driven shafts including a reaction member, abutment means for the reaction member, a brake for holding or releasing said abutment means, reduction gearing including overrunning clutch means between two of the gears for driving the tail shaft from the driven shaft, a clutch for driving the tail shaft directly from the driven shaft, fluid pressure means, means operated by the fluid pressure means for controlling the brake and the direct drive clutch, valve means controlling the application of the pressure means, solenoids controlling the valve means, an electric system for controlling the solenoids including switches operable to establish desired circuits for the solenoids, and a switch operated by the accelerator controlling the brake circuit, said accelerator operated switch being normally open to release the brake and being closed when the accelerator is depressed beyond engine idling position.

19. In a transmission, a driving shaft, a driven shaft, a tail shaft, a hydraulic torque converter in driving relation with said driving and driven shafts including a reversely operable reaction member, abutment means for preventing reverse rotation of the reaction member when held, means for connecting the abutment means in driving relation with the driven shaft when being rotated reversely, gearing including clutch means between two of the gears for driving the tail shaft from the driven shaft, a clutch for driving the tail shaft directly from the driven shaft, shifter means for selectively engaging and disengaging the direct drive clutch and the reduction gear clutch, control means for the shifter means including a governor, and means operable in response to actuation of the control means for blocking engagement of the reduction gear clutch above a predetermined speed of the tail shaft.

20. In a transmission, a driving shaft, a driven shaft, a tail shaft, a hydraulic torque converter in driving relation with said driving and driven shafts including a reaction member, abutment means for the reaction member, reduction gearing including overrunning clutch means and positive clutch means between two of the gears for driving the tail shaft from the driven shaft, a clutch for driving the tail shaft directly from the driven shaft, pressure means, means operable by the pressure means for selectively engaging the positive reduction gearing clutch and the direct drive clutch, valve means controlling the pressure means, solenoids controlling the valve means, an electric system for controlling energizing of the solenoids including switches operable to establish desired circuits for the solenoids and a main selector switch, a governor in the electric system driven from the tail shaft for controlling the circuit to the direct drive clutch solenoid, and means for blocking shifting of the selector switch to effect engagement of the positive reduction gearing clutch, said blocking means being under control of the governor to be moved out of blocking position only when the tail shaft is operating below a predetermined low speed.

21. In a driving system, an engine having a throttle valve controlling pedal, a driving shaft driven by the engine, a driven shaft, a tail shaft, a hydraulic torque converter in driving relation with said driving and driven shafts including a reaction member, abutment means for the reaction member, a brake for holding or releasing said abutment means, reduction gearing including overrunning clutch means between two of the gears for driving the tail shaft from the driven shaft, a clutch for driving the tail shaft directly from the driven shaft, said overrunning clutch engaging automatically when the direct drive clutch is disengaged and the brake is engaged, pressure means, means operated by the pressure means for controlling the brake and the direct drive clutch, valve means controlling the application of the pressure operated means, solenoids controlling the valve means, an electric system for controlling the solenoids including switches operable to establish desired circuits for the solenoids, a manually operable selector switch controlling the electric system, governor means responsive to the speed of the tail shaft for controlling the switch for the direct drive clutch solenoid, and switch means under control of the pedal controlling the solenoids for the brake and the direct drive clutch.

22. In a driving system, a driving shaft driven by the engine, a driven shaft, a tail shaft, a hydraulic torque converter in driving relation between said driving and driven shafts including a reaction member, abutment means for preventing reverse rotation of the reaction member, a brake for holding or releasing said abutment means, reduction gearing including overrunning clutch means between two of the gears for driving the tail shaft from the driven shaft, a clutch for driving the tail shaft directly from the driven shaft, a governor operating at tail shaft speed, a manually operable selector device, and means under the combined control of the pedal, the governor and the selector device effecting engagement of the brake and the direct drive clutch to provide direct drive from the driven shaft to the tail shaft above a predetermined tail shaft speed, and releasing the direct drive clutch below such predetermined speed and above engine idling speed to effect drive through the reduction gearing.

23. In a driving system, an engine having a fuel intake manifold and a throttle control pedal, a driving shaft driven by the engine, a driven shaft, a tail shaft, a hydraulic torque converter in driving relation with said driving and driven shafts including a reversely rotatable reaction member, abutment means for preventing reverse rotation of the reaction member, a brake for holding or releasing said abutment means, reduction gearing including overrunning clutch means between two of the gears for driving the tail shaft from the driven shaft, a clutch for driving the tail shaft directly from the driven shaft, shifter means for the direct drive clutch connected to be controlled by vacuum in the engine manifold to disconnect the clutch below a predetermined pressure, control means for the vacuum application to said shifter means, control means for the brake, a governor operated in accordance with tail shaft speed, and means responsive to the governor and the accelerator pedal for shifting the brake and direct speed clutch to establish a high or low speed drive from the driven shaft to the tail shaft.

24. In a driving system, an engine having a throttle control pedal and an electric ignition system, a driving shaft driven by the engine, a driven shaft, a tail shaft, a hydraulic torque converter in driving relation with said driving and driven shafts including a reaction member, abutment means for holding the reaction member from reverse rotation, means for connecting the abutment means in driving relation with the driven shaft when released, gearing including overrunning clutch means for driving the tail shaft at a reduced speed from the driven shaft, means for driving the tail shaft directly from the driven shaft, means for shifting said direct drive means, an electric system operable to control said direct drive clutch shifting means, a governor driven from the tail shaft for controlling the electric system to effect shifting of the shifting means, a switch in the electric system operable to overrule the governor when direct drive is established to effect shifting of the direct driving means out of direct drive relation, means operated by the pedal when moved beyond wide open throttle position for opening said switch to overrule the governor, and means operating to momentarily ground the ignition in response to initial shifting of the direct drive means into driving position, the ignition being restored by the control of the means for shifting the direct drive means.

25. In a driving system, an engine having a fuel intake manifold, a fuel control pedal and an electric ignition system, a driving shaft driven by the engine, a driven shaft, a tail shaft, a hydraulic torque converter in driving relation with said driving and driven shafts including a reaction member operable in a reverse direction, abutment means for holding the reaction member from rotating reversely, means for connecting the abutment member in driving relation with the driven shaft when released, gearing including overrunning clutch means for driving the tail shaft at a reduced speed from the driven shaft, a clutch for driving the tail shaft directly from the driven shaft, shift means operable to control the direct drive clutch, means connecting the manifold with the shift means for actuation by vacuum in the manifold, a valve in the connection, a solenoid for controlling said valve, an electric system including a governor operable to control the circuit for the solenoid, a switch in the electric system operable by the pedal when beyond full fuel delivery position for opening the solenoid circuit established by the governor to release the direct drive clutch, a ground circuit for the ignition system, means under control of the shift means for closing the ground circuit upon initial shifting of said clutch to direct drive position, and means operated by said solenoid actuated valve for opening the ground circuit momentarily after the ground circuit is closed.

FOREST R. McFARLAND.

REFERENCES CITED

The following references are of record in the file of this patent:

UNITED STATES PATENTS

| Number | Name | Date |
|---|---|---|
| 975,795 | Radcliffe | Nov. 15, 1910 |
| 1,576,996 | Radcliffe | Mar. 16, 1926 |
| 1,960,705 | Kochling | May 29, 1934 |
| 1,970,236 | Kluge et al. | Aug. 14, 1934 |
| 2,041,445 | Warren | May 19, 1936 |
| 2,042,189 | Rabe | May 26, 1936 |
| 2,104,608 | Cox et al. | Jan. 4, 1938 |
| 2,126,547 | Fottinger | Aug. 9, 1938 |
| 2,140,502 | Banker | Dec. 20, 1938 |
| 2,203,177 | Patterson | June 4, 1940 |
| 2,247,714 | Peterson et al. | July 1, 1941 |
| 2,251,972 | Banner | Aug. 12, 1941 |
| 2,261,128 | Roche | Nov. 4, 1941 |
| 2,282,591 | Orr | May 12, 1942 |
| 2,298,469 | Russell | Oct. 13, 1942 |
| 2,298,648 | Russell | Oct. 13, 1942 |
| 2,306,834 | Tipton | Dec. 29, 1942 |
| 2,343,304 | La Brie | Mar. 7, 1944 |
| 2,349,297 | Neracher et al. | May 23, 1944 |
| 2,373,453 | Brunken | Apr. 10, 1945 |
| 2,379,015 | Lysholm | June 26, 1945 |

FOREIGN PATENTS

| Number | Country | Date |
|---|---|---|
| 496,299 | Great Britain | Nov. 29, 1938 |

Certificate of Correction

Patent No. 2,448,678. September 7, 1948.

FOREST R. McFARLAND

It is hereby certified that errors appear in the printed specification of the above numbered patent requiring correction as follows:

Column 7, line 4, for the syllable and hyphen "mem-" read *member*; column 9, line 51, for "ain" read *main*;

and that the said Letters Patent should be read with these corrections therein that the same may conform to the record of the case in the Patent Office.

Signed and sealed this 28th day of December, A. D. 1948.

[SEAL]

THOMAS F. MURPHY,
*Assistant Commissioner of Patents.*